(12) United States Patent
Zimmer

(10) Patent No.: US 7,166,979 B2
(45) Date of Patent: Jan. 23, 2007

(54) METHOD FOR CONTROLLING A WINDSCREEN-WIPING DEVICE, AND WINDSCREEN-WIPING DEVICE FOR A MOTOR VEHICLE

(75) Inventor: Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 606 days.

(21) Appl. No.: 10/416,695

(22) PCT Filed: Jun. 14, 2002

(86) PCT No.: PCT/DE02/02171

§ 371 (c)(1),
(2), (4) Date: May 8, 2003

(87) PCT Pub. No.: WO03/026936

PCT Pub. Date: Apr. 3, 2003

(65) Prior Publication Data

US 2004/0010879 A1 Jan. 22, 2004

(30) Foreign Application Priority Data

Sep. 12, 2001 (DE) ................. 101 44 985

(51) Int. Cl.
*B60S 1/08* (2006.01)
(52) U.S. Cl. .............. 318/443; 318/DIG. 2; 15/250.12; 15/250.3
(58) Field of Classification Search ............ 15/250.12, 15/250.27, 250.3; 318/DIG. 2, 443, 444, 318/483
See application file for complete search history.

(56) References Cited

U.S. PATENT DOCUMENTS

| 4,663,575 | A | * | 5/1987 | Juzswik et al. ............. 318/444 |
| 5,642,026 | A | * | 6/1997 | McCann et al. ............ 318/806 |
| 5,826,295 | A | * | 10/1998 | Elmhirst et al. ......... 15/250.24 |
| 6,150,783 | A | * | 11/2000 | Michenfelder et al. ..... 318/443 |
| 6,157,154 | A | * | 12/2000 | Amagasa ..................... 318/443 |
| 6,184,642 | B1 | * | 2/2001 | Ausiello ..................... 318/483 |
| 6,281,649 | B1 | * | 8/2001 | Ouellette et al. ........... 318/443 |

FOREIGN PATENT DOCUMENTS

| DE | 197 00 457 C | 2/1998 |
| DE | 197 46 375 A | 4/1999 |
| EP | 1 010 594 A | 6/2000 |

* cited by examiner

*Primary Examiner*—Gary K. Graham
(74) *Attorney, Agent, or Firm*—Michael J. Striker

(57) ABSTRACT

A method for the open-loop control of a wiper system (10), and a wiper system (10), in particular for a motor vehicle includes at least one drive device (16), at least one gear (14), which switches the motion of the drive device (16) to at least one wiper shaft (34) and has a gear ratio that depends on the position of the gear (14), and at least one open-loop control unit (24), which controls the torque that can be output by the drive device (16) by means of a driven shaft (26). The control unit (24) determines the torque that can be output by the drive device (16) at every instant, taking the gear ratio into account.

10 Claims, 4 Drawing Sheets

METHOD FOR CONTROLLING A WINDSCREEN-WIPING DEVICE, AND WINDSCREEN-WIPING DEVICE FOR A MOTOR VEHICLE

CROSS-REFERENCE

The invention described and claimed hereinbelow is also described in PCT/DE 02/02171, filed on Jun. 14, 2002 and DE 101 44985.2, filed Sep. 12, 2001. This German Patent Application provides the basis for a claim of priority of invention under 35 U.S.C. 119 (a)–(d).

BACKGROUND OF THE INVENTION

The invention relates to a wiper system and a method for open-loop control of a wiper system.

Numerous methods for open-loop control of wiper systems are known, for instance from German Patent Disclosure DE 197 00 457. In these methods, the wiper motor in each case is triggered such that the position of the wiper blade on the window always move along a desired trajectory. In simpler methods, the speed of the wiper motor and thus the speed of the wiper blade on the window is reduced in the region of the turning points. However, this involves commonly used closed-loop control mechanisms for positionally accurate control of the wiper blade.

SUMMARY OF THE INVENTION

The method of the invention for open-loop control of a wiper system has the advantage that the torque that can be output by the drive device is determined at every instant taking the gear ratios into account. In this way, an overload on the drive device, which ensues for instance whenever snow or ice on the windshield causes blockage of the wiper system, can be effectively prevented. Such blockage is especially problematic if blockage of the wiper system occurs just before the turning point of the wiper arm, is reached. Since the usual wiper systems drive the wiper arms via a crank gear, the greatest loads occur in that case, since the drive device comes to a stop precisely in the extended or the covering position. The maximum attracting torque of the drive device then acts on the wiper system with the least gear ratio. In theoretical terms, in that case with rigid components, infinitely high forces would occur because of the toggle lever effect, since the amount of the effective lever arm tends toward zero.

It is especially advantageous if the gear is embodied as a crank gear, and the torque that can be output is determined as a function of the position of at least one crank, since the position of the cranks is responsible for the torque transmission from the drive device to the wiper arm.

It is furthermore considered advantageous if the drive device outputs a rotary motion, the gear converts the rotary motion into a pendulum motion with two turning points, and the torque is reduced before the turning points are reached, since in these turning points, the crank of the drive device is located in the covered or extended position and as a result the transmitted torque is maximal.

It is also advantageous if the drive device consumes a current I, and the torque is effected by a limitation of the current I. In this way, the torque can be limited by means of a simple current limiter.

Advantageously, the limitation of the current I is effected by a characteristic curve that is stored in memory in the control unit, as a result of which a completely freely selectable current limitation as a function of the gear position is made possible.

It is furthermore advantageous if the drive device is controlled electronically and has a position and/or rotary motion detector, so that the current limitation can be adapted exactly to the current gear position.

It is especially advantageous if the drive device is embodied as a reversing motor, and after the turning point is reached, a higher torque is output by the drive device than before the one turning point is reached, in order to obtain an optimal blockage protection.

Furthermore, it is especially advantageous if the torque is reduced only whenever a rated rotational speed of a driven shaft of a motor of the drive device fails to be attained; at elevated rotational speeds of the driven shaft, the point of departure must be that no hindrance or even blockage of the driven shaft occurs, as a result of which a torque reduction becomes unnecessary. Only upon a hindrance or even blockage of the driven shaft is it necessary to reduce the torque that acts on the driven shaft.

The wiper system of the invention has the advantage that a marked weight reduction of the entire system is possible because of smaller dimensions of the mechanical components, without having to integrate additional open-loop control hardware into the system. The result is advantageously markedly lower costs for production and disposal of the entire system.

BRIEF DESCRIPTION OF THE DRAWINGS

One exemplary embodiment of the invention is shown in the drawings and explained in further detail in the ensuing description. Shown are.

DETAILED DESCRIPTION OF THE PREFERRED EMBODIMENT

Figure 1:
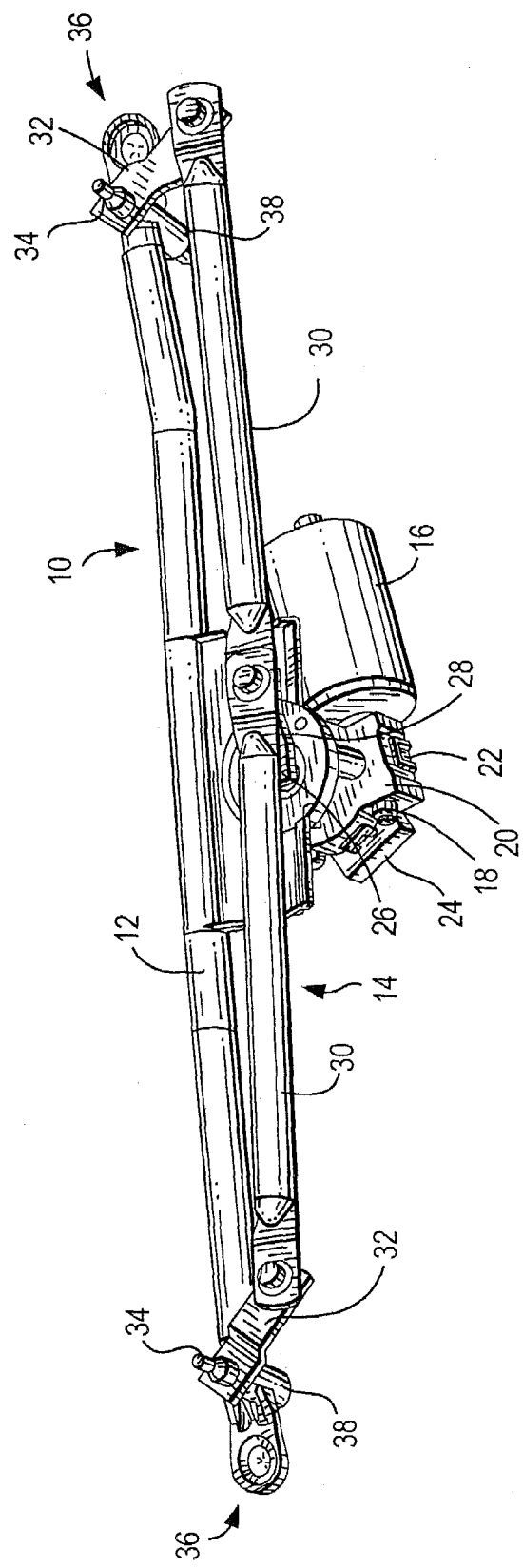
FIG. 1, a wiper system of the invention, shown schematically.

In FIG. 1, a wiper system 10 of the invention is shown in perspective. It essentially comprises a support tube 12, a gear 14, and a drive device 16. The drive device 16 is embodied as an electric motor, which may be in the form of a reversing motor or a revolving motor. The drive device 16 has an armature shaft 18, which drives a motor gear 20. The motor gear 20 is disposed in a motor gearbox 22, which is covered by a lid in which an open-loop control unit 24 is located. The motor gear 20 drives the gear 14 via a driven shaft 26. To that end, the gear 14 has a motor crank 28, which moves a thrust rod 30 that is rotatably joined to it.

If the drive device 16 is embodied as a reversing motor, then when current is supplied to the drive device, the motor crank 28 swings back and forth in pendulum fashion between two angular positions. In the case of a revolving motor, the motor crank 28 executes a revolving rotary motion.

Since the wiper system shown here is meant to drive two wiper arms, there are two thrust rods 30 disposed on the motor crank 28, resulting in a symmetrical design. Below, only one side of the wiper system will be described, since the other side behaves symmetrically.

The thrust rod 30 is joined so as to move rotationally with a drive crank 32, which upon a motion of the motor crank 28 sets a wiper shaft 34 into pendulum motion. The wiper shaft 34 is supported in a manner that is rotationally movable but axially fixed in a wiper bearing 36. To that end, the wiper bearing 36 has a cylindrical bearing bush 38.

If the driven shaft 26 now executes a circular motion, then the connection point between the motor crank 28 and the thrust rod 30 likewise moves along a circular path. The thrust rod 30 transmits this motion to the drive crank 32, which thereupon sets the wiper shaft 34 into a pendulum motion. This pendulum motion takes place between two turning points WL1 and WL2.

If the driven shaft 26 executes a pendulum motion, then the connection point between the motor crank 28 and the thrust rod 30 moves along a circular arc, and as a result the wiper shaft 34 is likewise set into a pendulum motion. This possibility that is realized by means of a reversing motor allows more freedom, in designing the wiper system 10, in terms of the choice of the turning points WL1, WL2 as well as other factors. In particular, in this way parking positions, which are assumed when the wiper system is not in operation, can be defined very simply.

The gear ratio of a crank gear of this kind varies continuously with the position of the gear, since the effective lever arm of the motor crank 28 and of the drive crank 32 depends on their deflection angle, since the moment applied to the wiper shaft depends on the vertical spacing of the longitudinal axis of the thrust rod 30 from the wiper shaft 34, or the vertical spacing from the driven shaft 26 of the motor 16.

In FIGS. 2a–2f, various positions of the gear 14 are shown.

Figure 2A:
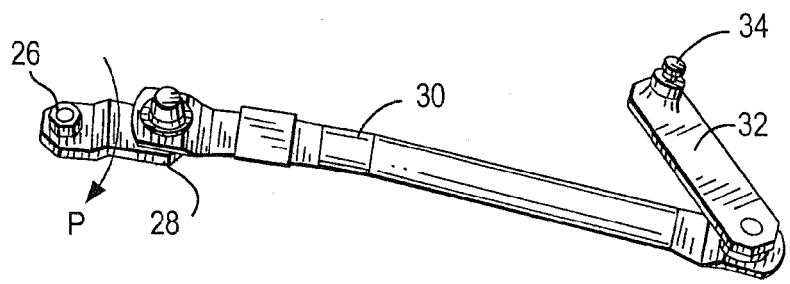
FIGS. 2*a*–2*f*, various gear positions of a wiper system of the invention.

In FIG. 2a, the gear 14 is in the insertion position. Here, the motor crank 28 and thrust rod 30 are located on a straight line, in such a way that the spacing between the driven shaft 26 and the connection point of the drive crank 32 and thrust rod 30 is maximal. A first turning point WL1 of the wiper system is therefore also in this position. Naturally, the turning point WL1 can also be located at some point reached earlier, if the drive device 14 is embodied as a reversing motor. In that case, the extended position is then not reached.

If the drive device 16 is a reversing motor, the motor crank 28 is not moved past the extended position, but instead moves clockwise, as represented by the arrow P.

Figure 2B:
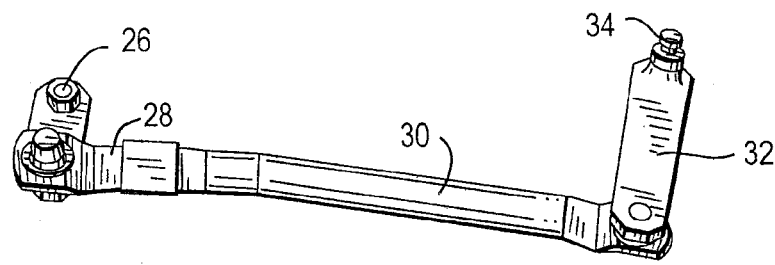
Figure 2C:
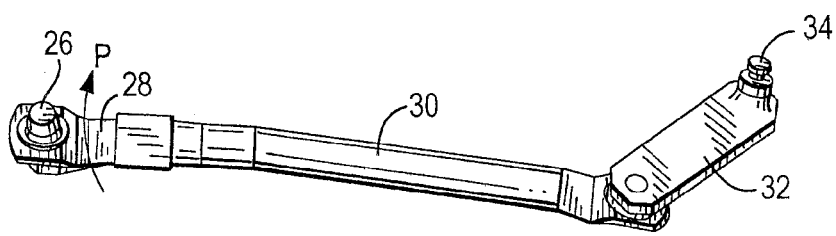
Figure 2D:
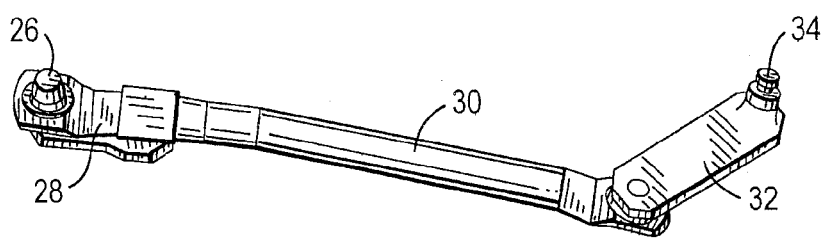
Figure 2E:
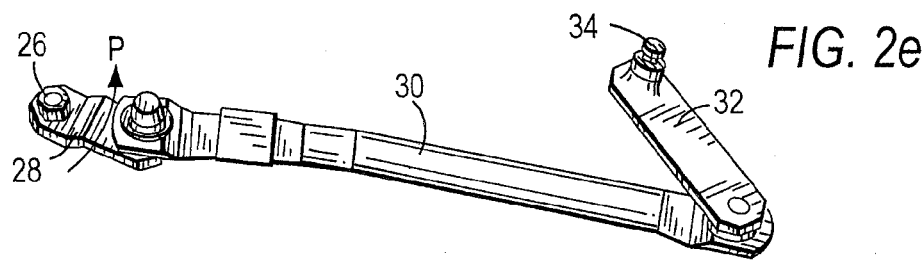

FIG. 2b shows the gear 14 in a middle position, and FIG. 2c shows it just before the covering position is reached. In the covering position, which is shown in FIG. 2d, the motor crank 28 and thrust rod 30 are located on a straight line, in such a way that the spacing between the driven shaft 26 and the connection point of the drive crank 32 and the thrust rod 30 is minimal. A second turning point WL2 of the wiper system is therefore also located in this position. Naturally, the turning point WL2 can also be located at some point reached earlier, if the drive device 14 is embodied as a reversing motor, and the rotary motion of the motor crank 28 is reversed at an earlier point.

FIG. 2e shows the gear 14, again just before the extended position is reached, when a reversing motor is used that has changed its rotary motion in the region of the covering position. The arrow P therefore also points counterclockwise here.

Figure 2F:
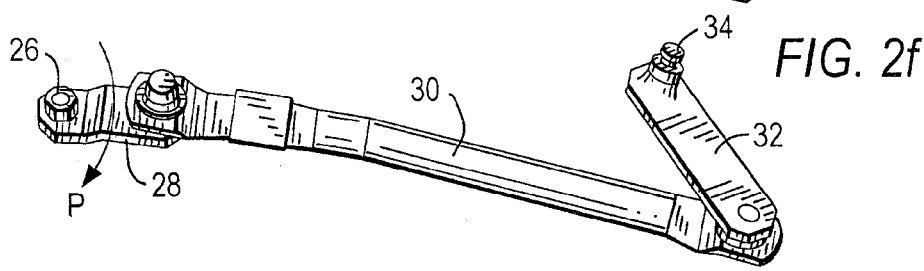

FIG. 2f shows the gear 14 just before the extended position is reached when a revolving motor is used, which always maintains the same rotary motion. The arrow P therefore points in the clockwise direction again here.

Figure 3:
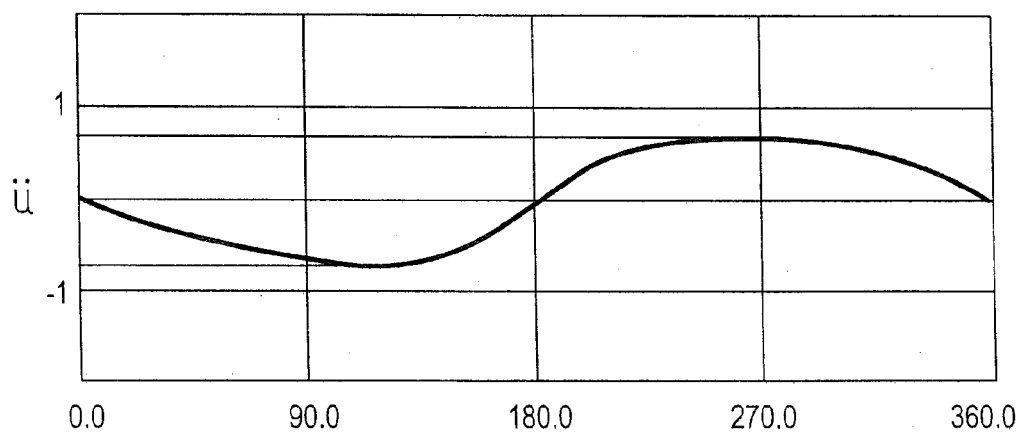
FIG. 3, a graph showing the gear ratio over the angular position of the motor crank of the drive device.

In FIG. 3, the gear ratio is shown over the deflection angle of the motor crank. The angle of 0° corresponds to the extended position, in which the longitudinal axis of the motor crank 28 and the longitudinal axis of the thrust rod 30 form parallels. At an angle of 180°, the gear is in the covering position. There, the two longitudinal axes of the motor crank 28 and of the thrust rod 30 are once again parallel, but the driven shaft 26 of the drive device 16 is concealed by the thrust rod 30, so that the spacing between the driven shaft 26 and the connection point of the thrust rod 30 and the drive crank 32 is minimal. The angle of 360° naturally again corresponds to the extended position, that is, the angle of 0°.

The gear ratio Ü changes its sign at 180°, since the rotary motion of the motor crank 28, in a revolving motor, remains the same but the direction of motion of the drive crank 32 and thus of the wiper shaft 34 reverses. The course of the gear ratio Ü is essentially sinusoidal; that is, the gear ratio varies continuously over the deflection angle of the motor crank 28. As a result, the torque transmitted also differs at each angular position.

Typically, the components of the gear 14, such as the motor crank 28, thrust rod 30, drive crank 32, and the bearings, are dimensioned such that in the wiping operation, the maximum torque required does not damage the components in the event of blockage. According to the invention, it is now provided that the torque that can be output by the drive device 16 is limited as a function of the angular position of the motor crank 28 by means of the control unit 24.

Figure 4:
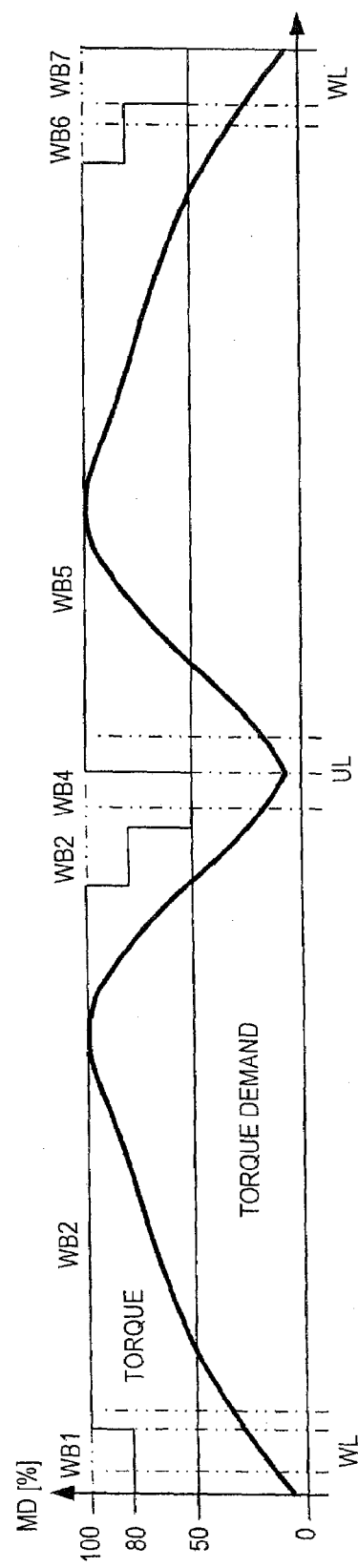
FIG. 4, a graph showing the torque demand and the torque limitation over the angular position of the motor crank.

In FIG. 4, the torque demand and the torque that can be output are shown as examples over the deflection of the motor crank 28. Since the force acting on the thrust rod 30 and thus on the drive crank 32 and the wiper shaft 34 is supposed to be limited, only a slight torque is needed at the turning points or at the turning point. In these regions, the vertical spacing between the thrust rod 30 and the driven shaft 26 is very slight, and as a result, despite the slight torque, a major force is produced. The force F should not be so high, however, that the thrust rod 30 or drive crank 32 or even the wiper arm will become warped in the event of blockage of the wiper blade or wiper arm. The range of rotation of the motor crank 28 is therefore divided up into a plurality of angular ranges WB1 through WB7, and for each of these angular ranges WB1 through WB7, its own maximum torque is defined.

In the first angular range WB1, the motor crank moves out of the extended position, up to an angle for instance of 10–20°. In this range, the torque that can be output is limited to 80% of the maximum torque that can be output. Next, in the second angular range WB2, the torque is limited to a set, maximum torque, which is meant to correspond to 100% and to the maximum torque required by the wiper system. This range therefore goes beyond the range of the maximum torque required.

In the third angular range WB3, the torque that can be output is again lowered to 80% of the maximum torque that can be output, and in a fourth angular range WB4, the torque is limited to approximately 50% of the maximum torque that can be output. This range is shortly before the turning point, for instance 10–15° before it, and ends at the turning point, in which the gear, that is, the motor crank 28 and the thrust rod 30, are in the covering position. Upon reaching the turning point, in this example, the torque is again limited to the maximum torque that can be output, but here again, a reduced range, such as 80%, can be selected first. This range corresponds to the fifth angular range WB5. Approximately 20–30° before the turning point is reached, the torque is again limited in the sixth angular range WB6 to 80%, and approximately 10° before the turning point is reached, in the seventh angular range, to approximately 50% of the maximum torque that can be output.

In FIG. 4, the drive device 16 is embodied as a reversing motor, which swings back and forth between two angular positions that do not correspond entirely to the extended and covering positions. For this reason, the dead center points at 0° and 180° of the position of the motor crank 28 are avoided.

Naturally, the exemplary embodiment shown in FIG. 4 can be varied arbitrarily. For instance, a continuous course of the torque demand, or somewhat above the torque demand, can be set, as a result of which the function of the system is indeed improved, but increased open- and closed-loop control is needed.

The invention claimed is:

1. A method for open-loop control of a wiper system for a motor vehicle, comprising the steps of providing at least one drive device (16), at least one gear (14), which switches the motion of the drive device (16) to at least one wiper shaft (34) and has a gear ratio that depends on the position of the gear (14), and at least one open-loop control unit (24), which controls the torque that can be output by the drive device (16) by means of a driven shaft (26), using the control unit (24) to determine the torque that can be output by the drive device (16) at every instant, taking the gear ratio into account.

2. The method of claim 1, wherein the gear (14) is embodied as a crank gear with a motor crank (28), and the torque that can be output is determined and limited as a function of the position of the motor crank (28).

3. The method of claim 1, wherein the drive device (16) outputs a rotary motion, the gear (14) converts the rotary motion into a pendulum motion with two turning points (WL1, WL2), and the torque is reduced before the turning points (WL1, WL2) are reached.

4. The method of claim 1, wherein the drive device (16) outputs a pendulum motion with two turning points (WL1, WL2), and the torque is reduced before at least one of the turning points (WL1, WL2) is reached.

5. The method of claim 4, wherein the drive device is embodied as a reversing motor, and after at least one turning point (WL1) is reached, a higher torque is output by the drive device (16) than before the at least one turning point (WL1) is reached.

6. The method of claim 1, wherein the drive device (16) is embodied as an electrical drive device (16) that consumes a current I, and the torque is limited by means of a limitation of the current I.

7. The method of claim 6, wherein the limitation of the current I is effected in accordance with a characteristic curve that is stored in memory in the control unit.

8. The method of claim 6, wherein the drive device (16) is controlled electronically and has a position and/or rotary motion detector.

9. The method of claim 1, wherein the torque is reduced only whenever a rated rotational speed of the driven shaft (26) or of an armature shaft of a motor of the drive device (16) fails to be attained.

10. A wiper system (10) for a motor vehicle, wherein the wiper system is controlled by an open loop control method, said system having at least one drive device (16), at least one gear (14), which switches the motion of the drive device (16) to at least one wiper shaft (34) and has a gear ratio that depends on the position of the gear (14), and at least one open-loop control unit (24), which controls the torque that can be output by the drive device (16) by means of a driven shaft (26), characterized in that the control unit (24) determines the torque that can be output by the drive device (16) at every instant, taking the gear ratio into account.

* * * * *